(12) United States Patent
Qin et al.

(10) Patent No.: US 8,288,907 B2
(45) Date of Patent: Oct. 16, 2012

(54) ELECTRIC MOTOR

(75) Inventors: Rui Feng Qin, Hong Kong (CN); James Ching Sik Lau, Hong Kong (CN); Yong Bin Li, Shenzhen (CN); Cheng Shun Du, Shenzhen (CN); Yuan Jiang, Shenzhen (CN)

(73) Assignee: Johnson Electric S.A., La Chaux-de-Fonds (CH)

( * ) Notice: Subject to any disclaimer, the term of this patent is extended or adjusted under 35 U.S.C. 154(b) by 0 days.

(21) Appl. No.: 12/505,219

(22) Filed: Jul. 17, 2009

(65) Prior Publication Data
US 2010/0013337 A1    Jan. 21, 2010

(30) Foreign Application Priority Data

Jul. 18, 2008  (CN) .......................... 2008 1 0141634
Nov. 10, 2008 (CN) .......................... 2008 1 0181479

(51) Int. Cl.
*H02K 21/26* (2006.01)
(52) U.S. Cl. ..................... 310/154.02; 310/89
(58) Field of Classification Search ............ 310/154.01–154.49, 89
See application file for complete search history.

(56) References Cited

U.S. PATENT DOCUMENTS

| | | | | |
|---|---|---|---|---|
| 3,889,141 A * | 6/1975 | Merriam | .................. | 310/154.24 |
| 4,296,343 A * | 10/1981 | McMillen | ................ | 310/154.48 |
| 4,372,035 A * | 2/1983 | McMillen | ....................... | 29/596 |
| 4,797,592 A * | 1/1989 | England | .................... | 310/154.48 |
| 6,995,488 B1 * | 2/2006 | Yamashita et al. | ........ | 310/154.21 |
| 2005/0093389 A1 * | 5/2005 | Simofi-Ilyes et al. | ... | 310/154.08 |

* cited by examiner

*Primary Examiner* — Nguyen N Hanh
(74) *Attorney, Agent, or Firm* — Muncy, Geissler, Olds & Lowe, PLLC

(57) ABSTRACT

An electric motor has a housing, a rotor rotatably installed in the housing, n permanent magnets with the same polarity fixed at an inner surface of the housing. The rotor is a wound armature having a plurality of teeth extending in a radial direction. The housing includes n inner projecting parts, the permanent magnets and the inner projecting parts being alternately arranged in a circumferential direction about the rotor. The magnets generate 2n magnetic circuits via the housing and the rotor, n being an integer greater than one. The size of at least a portion of a first air gap formed between the permanent magnets and the rotor is greater than the size of at least a portion of a second air gap formed between the inner projecting parts and the rotor.

14 Claims, 4 Drawing Sheets

ELECTRIC MOTOR

CROSS REFERENCE TO RELATED APPLICATIONS

This non-provisional patent application claims priority under 35 U.S.C. §119(a) from Patent Application No. 200810141634.3 filed in The People's Republic of China on Jul. 18, 2008, and Patent Application No. 200810181479.8 filed in The People's Republic of China on Nov. 10, 2008.

FIELD OF THE INVENTION

The present invention relates to the field of electric motors, and in particular to a permanent magnet DC motor.

BACKGROUND OF THE INVENTION

The permanent magnet DC motor has been widely used in fields such as office automatization, household appliance, and automobile electric parts, for it has the advantages of simple structure, reliable electromagnetic properties, and simple maintenance.

Referring to FIG. 8, a traditional permanent magnet DC motor usually uses four permanent magnets 101~104, fixed symmetrically inside the iron shell or housing of the motor stator to produce four field poles, thus, the number of permanent magnets equals the number of field poles and each magnetic circuit is formed by two magnets in series. Viewed from outside the stator, the orientation of adjacent magnets is opposite. However, this traditional rotor configuration will not be suitable for low power motors with a small size. When using high remanence rare earth magnets, thin permanent magnets can satisfy the magnetic requirement of the low power motor. However, thin magnets, especially magnets having a wall thickness of less than 2 mm, are very delicate and are easy to be damaged during manufacture and assembly. To thicken the magnets in order to avoid being damaged in assembly will result in low utilization and wastage of the magnet material. As there are two pieces of magnet in series in each equivalent magnetic circuit, and the magnetic field is so strong, the stator housing will be saturated. In other words, the magnet material is wasted. Furthermore, adjacent magnets with opposite magnetic poles will complicate the process of assembling the magnets into the housing.

U.S. Pat. No. 4,296,343 discloses an electric motor using two magnets and two inwardly projecting pole pieces of the housing to create four field poles. However, the size of the air gaps between the magnets and the armature is equal to the size of the air gaps formed between the inwardly projecting pole pieces and the armature. The resulting field distribution between the magnet poles and the housing poles is uneven.

SUMMARY OF THE INVENTION

To solve the above mentioned problems, the present invention provides a motor which includes: a housing; a rotor rotatably mounted in the housing; and n permanent magnets with the same polarity fixed to an inner surface of the housing. The housing includes n inner projecting parts. The permanent magnets and the inner projecting parts are alternately arranged in a circumferential direction about the rotor. The magnets generate 2n magnetic circuits via the housing and the rotor, n being an integer greater than one. The size of at least a portion of first air gaps formed between the permanent magnets and the rotor is greater than the size of at least a portion of second air gaps formed between the inner projecting parts and the rotor. This results in imbalance of Back-EMF between the magnet field poles and the induced field poles being reduced.

Preferably, the first air gaps have a constant width and the second air gaps have a constant width.

Alternatively, the first air gaps have a constant width, and the second air gaps have a varying width, the size of the first air gaps being greater than the minimum size of the second air gaps.

Alternatively, the first air gaps have a varying width, and the second air gaps have a constant width, the maximum size of the first air gaps being greater than the size of the second air gaps.

Alternatively, the first air gaps have a varying width, and the second air gaps have a varying width, the maximum size of the first air gaps being greater than the maximum size of the second air gaps.

Preferably, the size of the first air gaps formed between the permanent magnets and the rotor is in the range of 0.4 mm to 0.8 mm, and the size of the second air gaps formed between the inner projecting parts and the rotor is in the range of 0.4 mm to 0.6 mm.

More preferably, the size of the first air gaps formed between the permanent magnets and the rotor is in the range of 0.4 mm to 0.7 mm, and the size of the second air gaps formed between the inner projecting parts and the rotor is in the range of 0.4 mm to 0.46 mm.

Preferably, the motor is a permanent magnet DC motor.

Preferably, n is equal to two, and the two permanent magnets form two magnet field poles at the two permanent magnets and two induced field poles at the two inner projecting parts respectively.

Preferably, the circumferential width of the permanent magnets is greater than the circumferential width of the inner projecting part, measured in radians.

Preferably, inner surfaces of the permanent magnets face the rotor, outer surfaces of the permanent magnets are fixed to an inner surface of the housing, and the inner surface and the outer surface of each permanent magnet are non-concentric.

Preferably, the thickness of a middle part of each permanent magnet is greater than the thickness of the circumferential end parts thereof, such that the air gap between the middle part and the rotor is smaller than the air gap between the end parts and the rotor.

Preferably, the thickness of the housing is uniform, and the inner projecting parts of the housing are formed by stamping or drawing inwards the corresponding parts of the housing in a radial direction of the housing.

Preferably, the rotor is a wound armature having a plurality of radially extending teeth about which an armature winding is wound.

BRIEF DESCRIPTION OF THE DRAWINGS

Preferred embodiments of the invention will now be described, by way of example only, with reference to figures of the accompanying drawings. Dimensions of components and features shown in the figures are generally chosen for convenience and clarity of presentation and are not necessarily shown to scale. The figures are listed below.

DETAILED DESCRIPTION OF THE PREFERRED EMBODIMENTS

The technical problem to be solved, the technical solution and the beneficial effects of the present invention are best understood from the following detailed description of preferred embodiments with reference to the accompanying figures. It is to be understood that, the specific embodiments described here are merely examples to explain the invention and are not intended to limit the present invention.

Figure 1:
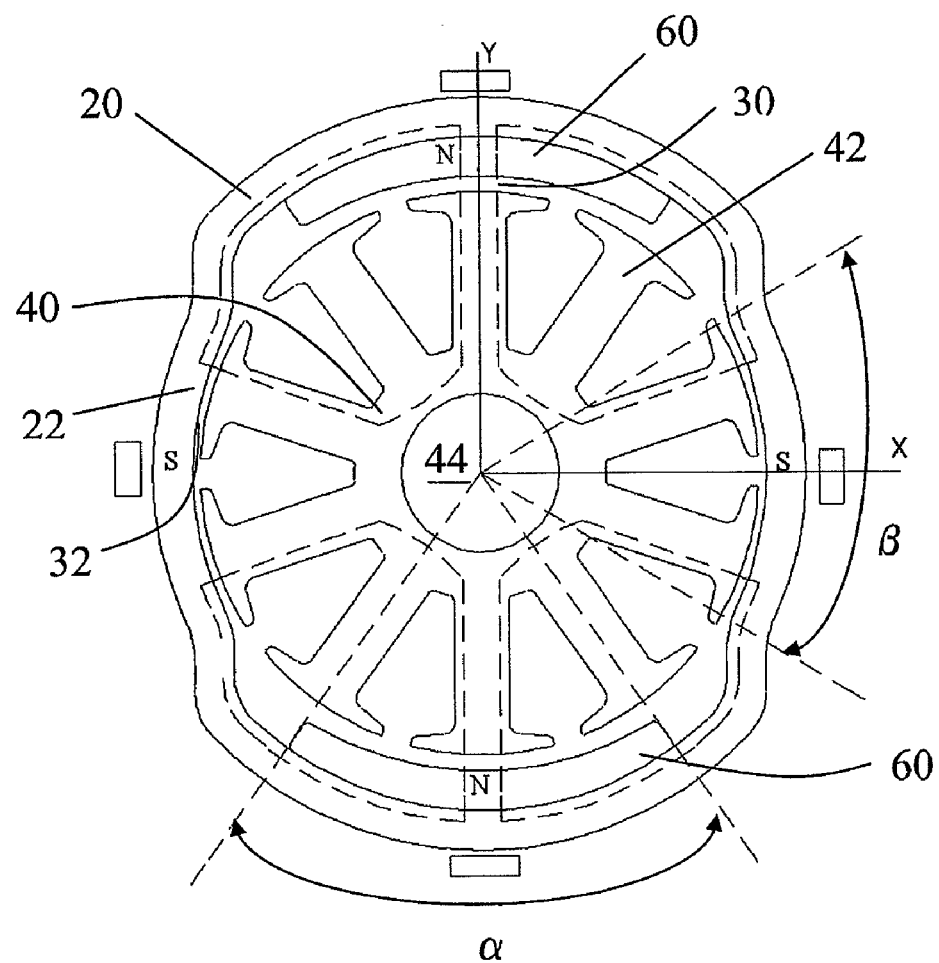
FIG. 1 is a sectional view of a motor according to a first embodiment of the present invention.
Figure 2:
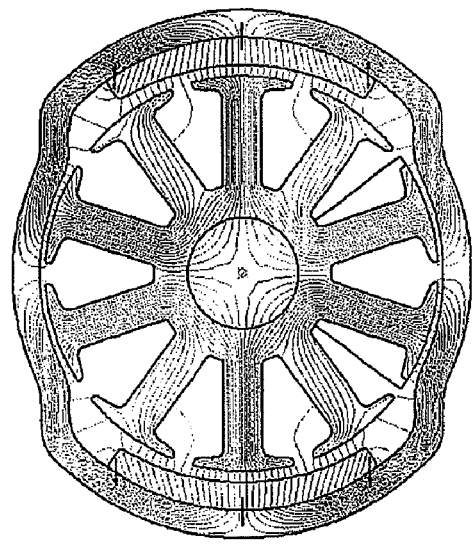
FIG. 2 is a magnetic flux distribution and field density diagram of the motor of FIG. 1.

FIG. 1 and FIG. 2 show a DC motor according to a preferred first embodiment of the present invention having a housing 20, a rotor 40 rotatably mounted in the housing 20, a pair of permanent magnets 60 diametrically fixed on an inner surface of the housing 20 and located between the housing 20 and the rotor 40.

The housing 20 is made of a magnetically conductive material and has a substantially cylindrical shape. Two parts of the housing 20 between the magnets 60 in the circumferential direction project inwards in the radial direction to form two inner projecting parts 22. The inner projecting parts 22 may be formed by stamping or drawing inwards the corresponding parts of the housing 20.

The rotor 40 is fixed on a shaft 44. The rotor 40 is a wound armature comprising a plurality of laminations stacked along the axial direction of the motor. The rotor 40 comprises a plurality of teeth 42 extending in the radial direction of the motor. Windings (not shown) are wound on the teeth 42.

Preferably, the magnets 60 are made of rare earth materials. The inner surface of the permanent magnets 60 face the teeth 42 of the rotor 40, and the outer surfaces thereof are fixed to the inner surface of the housing 20. The two permanent magnets 60 and the two inner projecting parts 22 are alternately disposed about the circumference of the rotor 40. Along the radial direction of the rotor, the air gaps formed between the inner surface of the magnets 60 and the outer surface of the rotor 40 are defined as first air gaps 30, and the air gaps formed between the inner surface of the inner projecting parts 22 of the housing 20 and the outer surface of the rotor 40 are defined as second air gaps 32.

The two magnets 60 form four magnetic field poles, for example, two magnet field poles N at the two permanent magnets 60 and two induced field poles S at the two inner projecting parts 22. Each magnet field pole N and each induced field poles S cooperatively form a magnetic circuit passing through the rotor 40. Thus, there is only one piece of permanent magnet in series in each magnetic circuit which results in making full use of the magnets and the saturation problem of the magnetic circuit is avoided or at least greatly reduced.

In order to reduce imbalance in the Back-EMF between the magnet field poles and the induced field poles, the size of at least one portion of the first air gap 30 is greater than the size of at least one portion of the second air gap 32. Please note, the size of the air gap in the present invention means the width of the air gap measured in the radial direction of the rotor. Also, the air gaps may be constant or varying. By constant we mean that the width of the air gap measured in the radial direction is constant. By varying, we mean that the width of the air gap varies in the circumferential direction, preferably, but not essentially, in a smooth manner.

Figure 5:
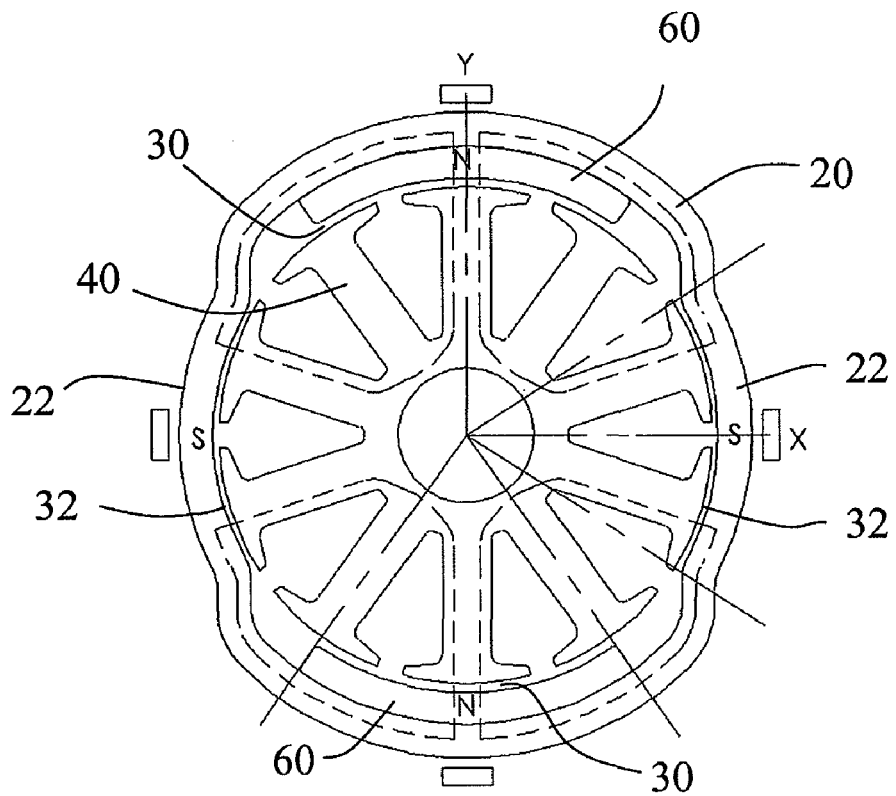
FIG. 5 is a sectional view, similar to FIG. 1 of a motor according to a second embodiment.
Figure 6:
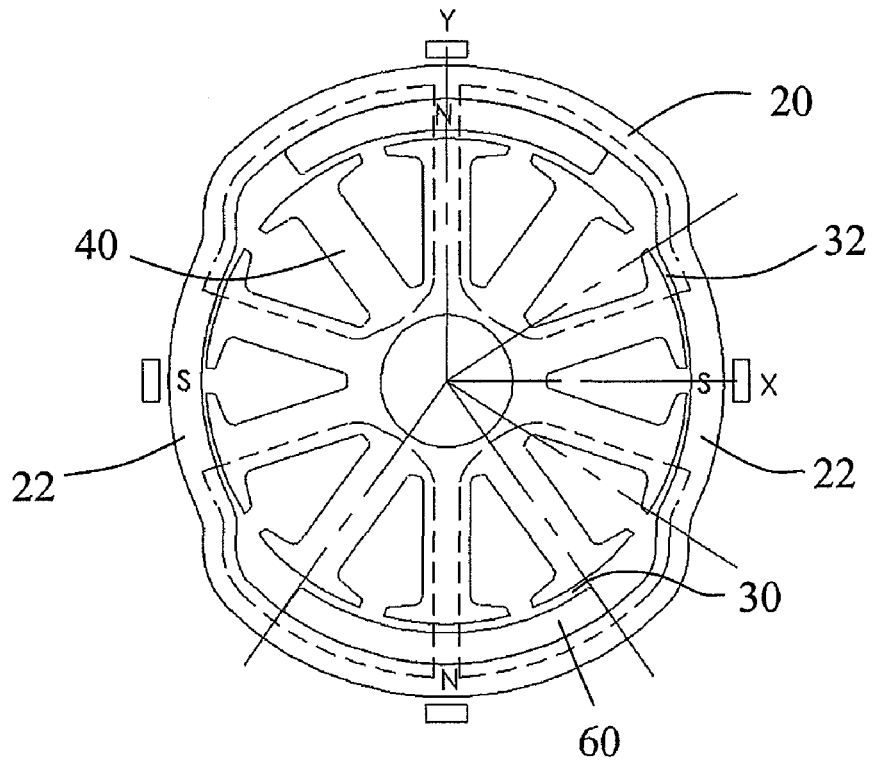
FIG. 6 is a sectional view, similar to FIG. 1 of a motor according to a third embodiment.
Figure 7:
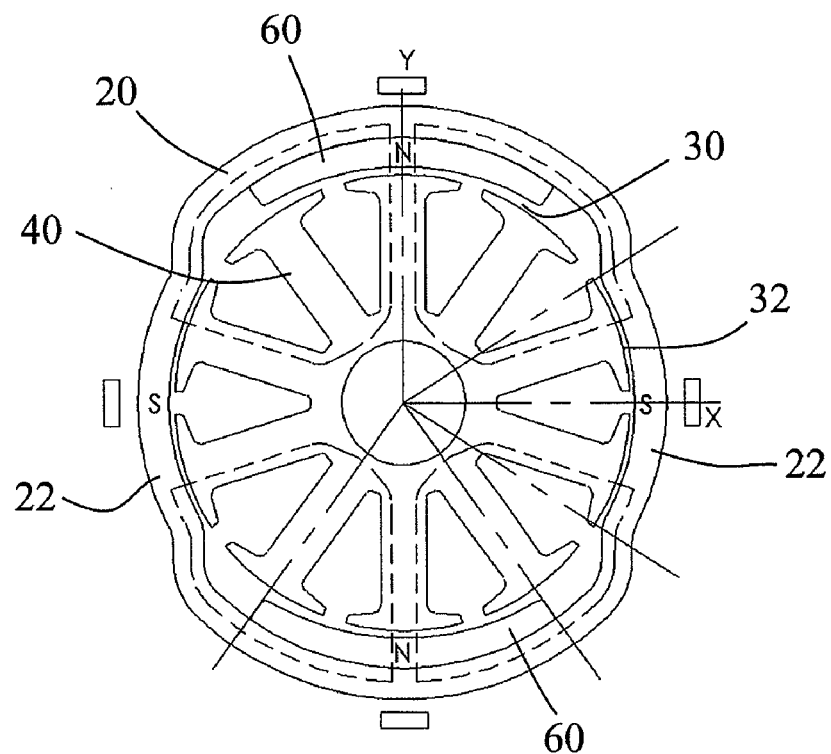
FIG. 7 is a sectional view, similar to FIG. 1 of a motor according to a fourth embodiment.
Figure 8:
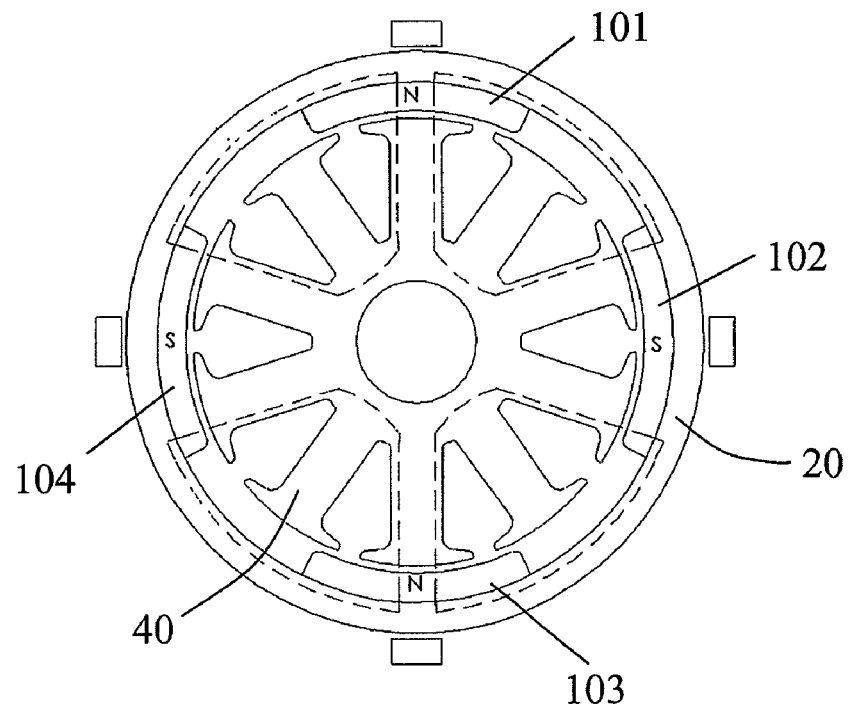
FIG. 8 is a sectional view of a conventional motor.

In the first embodiment of FIG. 1, the first air gaps 30 and the second air gaps 32 are varying air gaps. FIG. 5 illustrates a second embodiment, similar to the first embodiment except that the first air gaps 30 and the second air gaps 32 are constant air gaps. FIG. 6 illustrates a third embodiment, similar to the first embodiment except that the first air gaps 30 are constant air gaps and the second air gaps 32 are varying air gaps. FIG. 7 illustrates a fourth embodiment, similar to the first embodiment except that the first air gaps 30 are varying air gaps and the second air gaps 32 are constant air gaps.

Specifically, when the air gaps 30 are constant and the air gaps 32 are constant, the size of the air gaps 30 should be greater than the size of the air gaps 32. When the air gaps 30 are constant and the air gaps 32 are varying, the size of the air gaps 30 should be greater than the minimum size of the air gaps 32. Preferably, the size of the air gaps 30 is greater than or equal to the maximum size of the air gaps 32. When the air gaps 30 are varying and the air gaps 32 are constant, the maximum size of the air gaps 30 should be greater than the size of the air gaps 32. When both the air gaps 30 and the air gaps 32 are varying, the maximum size of the air gaps 30 should be greater than the minimum size of the air gaps 32. Preferably, the maximum size of the air gaps 30 is greater than the maximum size of the air gaps 32. For example, the size of the air gap 30 is in the range of 0.4 mm to 0.8 mm, and the size of the air gap 32 is in the range of 0.4 mm to 0.6 mm. In one preferred embodiment, the size of the air gap 30 is in the range of 0.4 mm to 0.7 mm, and the size of the air gap 32 is in the range of 0.4 mm to 0.46 mm, i.e., the maximum size of the air gaps 30 is greater than the maximum size of the air gaps 32 and the minimum size of the air gaps 30 is equal to the minimum size of the air gaps 32.

Referring back to the first embodiment as shown in FIG. 1, preferably the inner surface and the outer surface of the magnets 60 are non-concentric arcs. The middle part of the permanent magnet 60 is thicker than the two circumferential end parts such that the air gap between the middle part and the armature 40 is smaller than the air gap between the end parts and the armature 40. Preferably, the thickness of the magnet 60 is gradually reduced from the middle part to the end parts such that the air gap between the magnet 60 and the armature 40 becomes gradually wider from the middle part to the end parts.

Preferably, in order to further reduce imbalance of Back-EMF, the angle $\alpha$ subtended by each magnet 60 is greater than the angle $\beta$ subtended by each inner projecting part 22. That is, the circumferential extent or width of the magnet poles is preferably greater than that of the induced poles.

Figure 3:
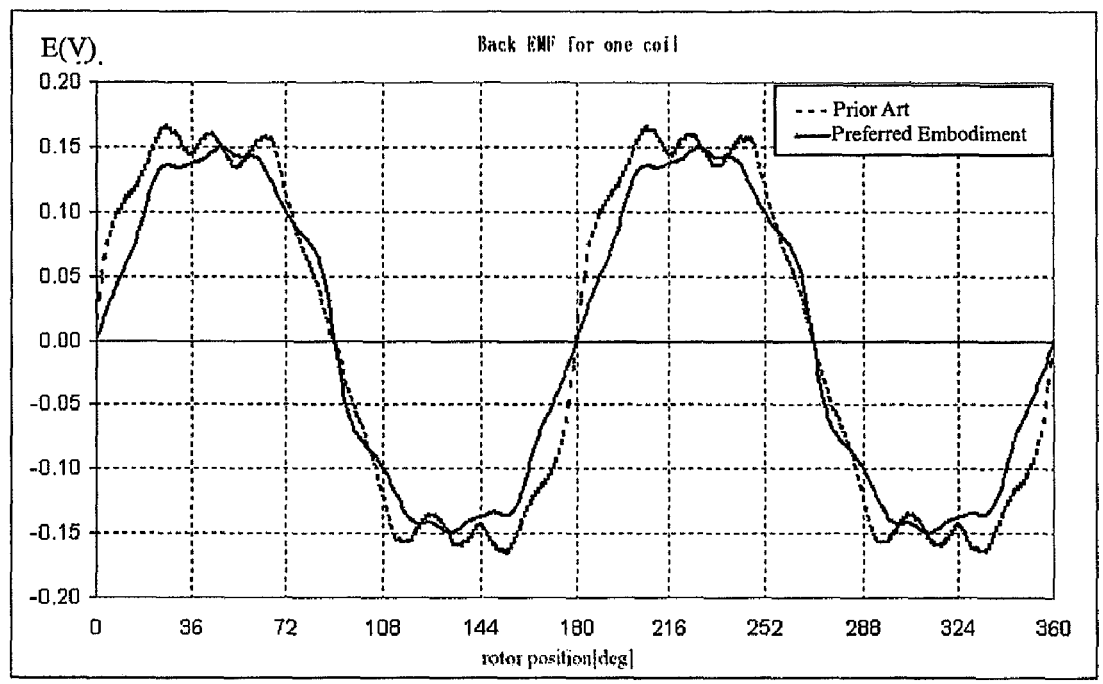
FIG. 3 shows two Back-EMF waves respectively for one coil of the armature of the motor of FIG. 1 and one coil of the armature of a prior art motor.
Figure 4:
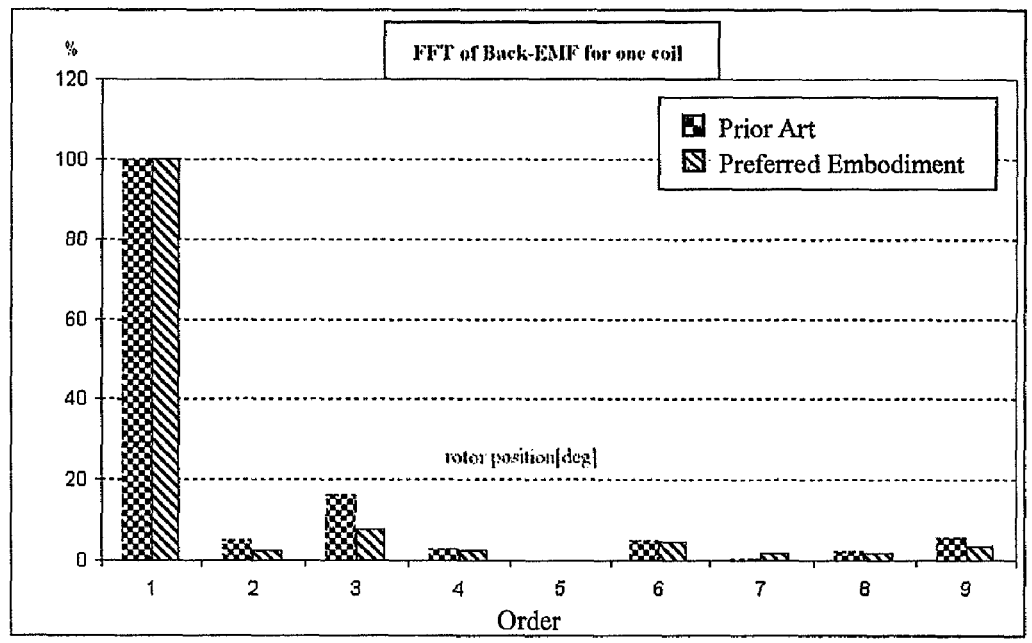
FIG. 4 is FFT of the Back-EMF waves of FIG. 3.

FIG. 3 shows two Back-EMF waves respectively for one coil of the armature of a motor according to the first embodiment of FIG. 1, in which the size of at least one portion of the air gap 30 is greater than the size of at least one portion of the air gap 32 and one coil of the armature of a prior art motor according to U.S. Pat. No. 4,296,343, in which the size of the air gaps 30 and 32 are constant and equal to each other. FIG. 4 is a FFT (Fast Fourier Transform) of the Back-EMF waves of FIG. 3.

Referring to FIG. 3, the dashed line in FIG. 3 represents the wave for one coil of the armature of the prior art motor and the solid line represents the wave for one coil of the armature of the first embodiment. It can be seen that the imbalance of Back-EMF in the motor of the first embodiment is reduced compared with the prior art motor, which may be confirmed by viewing the FFT of FIG. 4, which shows that the even order harmonic components in the FFT of the Back-EMF waves corresponding to the motor of the first embodiment is less compared with the prior art motor. In FIG. 4 the checkered columns represent the prior art motor while the hatched columns represent the motor of the first embodiment.

In the above embodiments of the present invention, by using half the number of permanent magnet pieces with the same polarizations it is capable of achieving the same number of field poles as compared with the conventional motor, which simplifies the stator assembly process. Furthermore, material utilization ratio of the rare earth magnets is increased and the magnets can be made with a comparatively greater thickness, which reduces the possibility of the magnets being broken during production and assembly of the magnets into the housing. As the orientation of the magnetic field of each magnet is the same, the process of assembling and magnetizing the magnets is simplified. The size of at least one portion of the air gap 30 is greater than the size of at least one portion of the air gap 32, which results in a reduction of the imbalance of Back-EMF between the magnet field poles and the induced field poles. The width of the magnets being greater than the width of the inner projecting part, measured in radians, is also beneficial to reduce imbalance of the Back-EMF between the magnet field poles and the induced field poles.

Although the invention is described with reference to one or more preferred embodiments, it should be appreciated by those skilled in the art that various modifications are possible. Therefore, the scope of the invention is to be determined by reference to the claims that follow.

In the description and claims of the present application, each of the verbs "comprise", "include", "contain" and "have", and variations thereof, are used in an inclusive sense, to specify the presence of the stated item but not to exclude the presence of additional items.

The invention claimed is:

1. An electric motor comprising:
a housing;
a rotor rotatably mounted in the housing;
n arc-shaped permanent magnets with a same polarity fixed at an inner surface of the housing;
wherein portions of the housing are deformed inwardly to form n arc-shaped inner projecting parts, the permanent magnets and the inner projecting parts being alternately arranged in a circumferential direction about the rotor, the permanent magnets forming n magnet field poles at the permanent magnets and n induced field poles at the inner projecting parts whereby generating 2n magnetic circuits via the housing and the rotor, n being an integer greater than one,
wherein the circumferential width of the magnet field poles is greater than the circumferential width of the induced field poles; and
wherein arc inner surfaces of the permanent magnets face the rotor, arc outer surfaces of the permanent magnets are fixed to the inner surface of the housing, and the inner surface and the outer surface of each permanent magnet are non-concentric.

2. The motor of claim 1, wherein air gaps formed between the induced field poles and the rotor become gradually wider from middle parts thereof to end parts thereof.

3. The motor of claim 1, wherein air gaps formed between the permanent magnets and the rotor become gradually wider from middle parts thereof to end parts thereof.

4. The motor of claim 1, wherein the size of at least a portion of first air gaps formed between the permanent magnets and the rotor is greater than the size of at least a portion of second air gaps formed between the inner projecting parts and the rotor.

5. The motor of claim 4, wherein the size of first air gaps is in the range of 0.4 mm to 0.8 mm and the size of second air gaps is in the range of 0.4 mm to 0.6 mm.

6. The motor of claim 1, wherein the thickness of the housing is uniform.

7. An electric motor comprising:
a housing with a uniform thickness;
a rotor rotatably mounted in the housing;
n arc-shaped permanent magnets with a same polarity fixed at an inner surface of the housing,
wherein portions of the housing are deformed inwardly to form n arc-shaped inner projecting parts such that outer surfaces of the inner projecting parts are closer to the rotor compared to outer surfaces of the remaining portions of the housing, the permanent magnets and the inner projecting parts being alternately arranged in a circumferential direction about the rotor, the permanent magnets forming n magnet field poles at the permanent magnets and n induced field poles at the inner projecting parts whereby generating 2n magnetic circuits via the housing and the rotor, n being an integer greater than one; and
wherein air gaps formed between the induced field poles and the rotor have a varying width.

8. The motor of claim 7, wherein the air gaps formed between the induced field poles and the rotor become gradually wider from middle parts thereof to end parts thereof.

9. The motor of claim 7, wherein air gaps formed between the permanent magnets and the rotor become gradually wider from middle parts thereof to end parts thereof.

10. The motor of claim 7, wherein the thickness of a middle part of each permanent magnet is greater than the thickness of the circumferential end parts thereof such that the air gap formed between the middle part and the rotor is smaller than the air gap between the end parts and the rotor.

11. An electric motor comprising:
a housing;
a rotor rotatably mounted in the housing;
n arc-shaped permanent magnets with a same polarity fixed at an inner surface of the housing,
wherein portions of the housing are deformed inwardly to form n arc-shaped inner projecting parts such that outer surfaces of the inner projecting parts are closer to the rotor compared to outer surfaces of the remaining portions of the housing, the permanent magnets and the inner projecting parts being alternately arranged in a circumferential direction about the rotor, the magnets generating 2n magnetic circuits via the housing and the rotor, n being an integer greater than one, and the size of at least a portion of first air gaps formed between the permanent magnets and the rotor is greater than the size of at least a portion of second air gaps formed between the inner projecting parts and the rotor.

12. The motor of claim 11, wherein the first air gaps have a constant width.

13. The motor of claim 11, wherein the second air gaps become gradually wider from middle parts thereof to end parts thereof.

14. The motor of claim 11, wherein the housing has a uniform thickness and the thickness of a middle part of each permanent magnet is greater than the thickness of the circumferential end parts thereof such that the air gap formed between the middle part and the rotor is smaller than the air gap formed between the end parts and the rotor.

\* \* \* \* \*